UNITED STATES PATENT OFFICE.

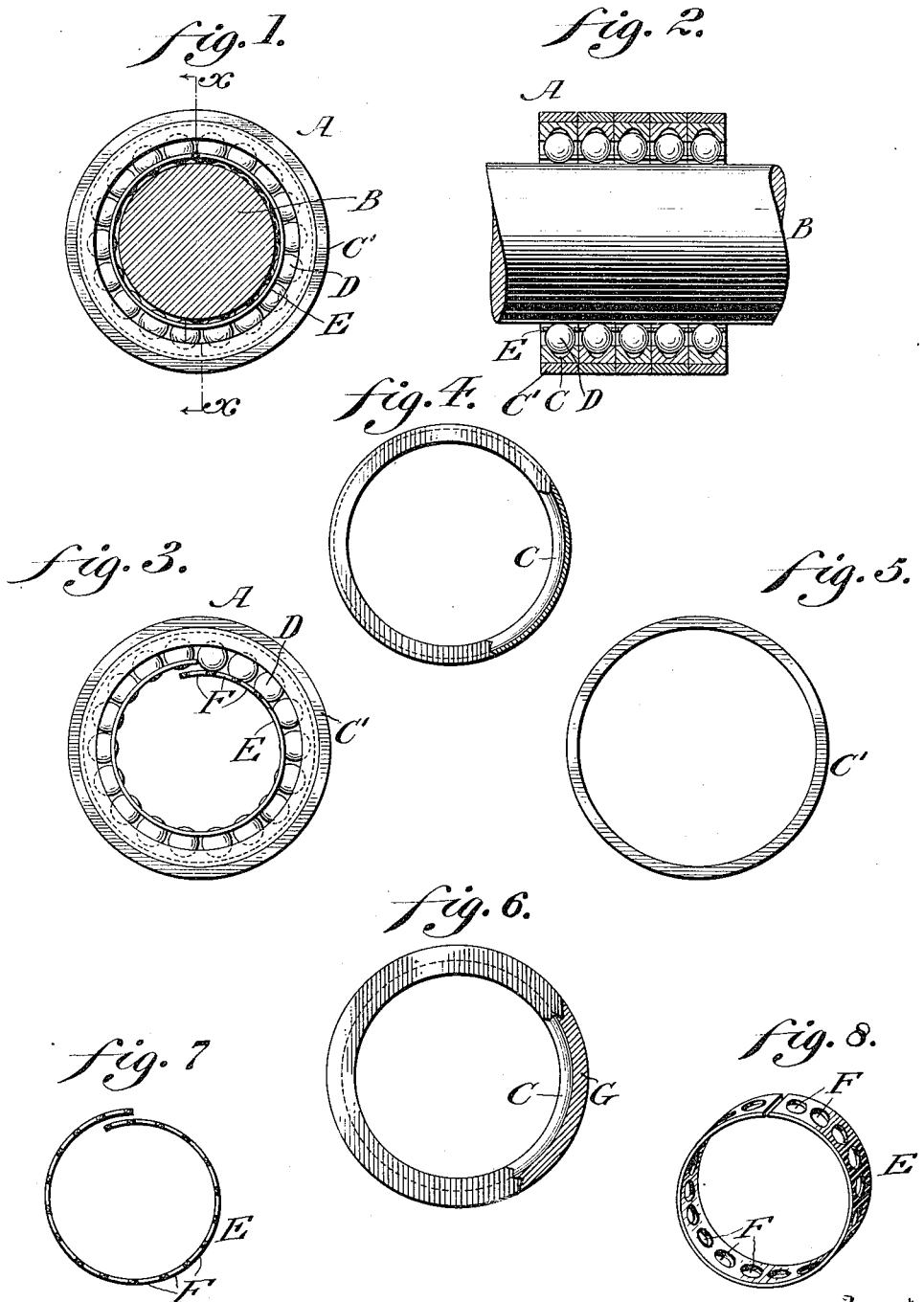

JULIUS KELLER, OF PHILADELPHIA, PENNSYLVANIA, ASSIGNOR TO THE KELLER TOOL COMPANY, OF PENNSYLVANIA.

BALL-BEARING.

SPECIFICATION forming part of Letters Patent No. 644,608, dated March 6, 1900.

Application filed February 7, 1899. Serial No. 704,780. (No model.)

*To all whom it may concern:*

Be it known that I, JULIUS KELLER, a citizen of the United States, residing in the city and county of Philadelphia, State of Pennsylvania, have invented a new and useful Improvement in Ball-Bearings, which improvement is fully set forth in the following specification and accompanying drawings.

This invention consists of a retaining-ring for ball-bearings, and is particularly applicable to bearings wherein one member is cylindrical, like a shaft, and also where there are a plurality of independent sets of balls upon the same shaft situated in such proximity that ordinary means for retaining the balls cannot be employed.

The invention further consists in the details of construction hereinafter fully described and specifically claimed.

Figure 1 represents an end elevation of a ball-bearing embodying this invention. Fig. 2 is a longitudinal section taken on line $x\ x$, Fig. 1. Fig. 3 represents an end elevation illustrating the manner of inserting the retaining-ring and before being applied to the shaft. Figs. 4, 5, and 6 represent side elevations of ball-bearing rings. Fig. 7 represents a section of the retaining-ring. Fig. 8 is a perspective view of the same.

Similar letters of reference indicate corresponding parts in the figures.

The retaining-ring forming the subject of this invention is especially adapted for use in connection with ball-bearings in which the member supported by the balls is cylindrical, and to illustrate the same I have shown a bearing in which the balls are situated interiorly and support a shaft passing therethrough. It will be understood, of course, that my invention is applicable to other than cylindrical bearings, as shown, and, further, that the location of the balls interiorly is only an embodiment thereof.

Referring to the drawings, A designates the bearing, and B the shaft. Said bearing A is provided interiorly with the usual race C, containing the balls D, supporting said shaft B. The race C consists of an annular channel or groove to receive one side of the ball and simply retains the balls against lateral movement in one direction or away from the shaft and against longitudinal movement in either direction. The retaining-ring E is resilient and separated at one side to permit its compression or expansion and is provided with a plurality of openings F to receive portions of the balls—that is to say, the exposed sides thereof. The diameters of the openings F are less than the diameters of the balls, and said openings are so disposed relative to the diameter of the ring and the balls D that when the ring is in place the said balls register with the openings and extend through the same, so as to project a little distance on the other side thereof, it being noted that owing to the relative dimensions of the parts the balls can turn freely within the openings without binding. The retaining-ring E serves simply to prevent the balls from moving away from or out of the channel or groove of the race C, the diameter of the ring being greater or less than the distance between the exposed sides of balls on opposite sides of the race, accordingly as said balls are situated interiorly or exteriorly relative thereto. The openings in the ring permit the exposed side of the balls to project therethrough to be engaged by the bearing, while the diameter of the balls being greater than that of the openings the balls are held within the race. The bearing is therefore complete in itself—that is to say, the journal or shaft can be removed without disturbing any part thereof, the balls being incapable of movement, except around the race, unless the retaining-ring is removed.

In Fig. 1 the parts are shown in the position they assume in operation.

In Fig. 3 the ring is shown as it is being applied—that is to say, after the balls are placed in the race and one end portion of the ring has been applied to the balls, while the other end is bent inwardly and ready to be sprung outwardly to cause the balls to seek their openings.

It is understood, of course, that the ends of the ring abut and can be connected after being applied by solder or otherwise, or they may be separated, relying upon the resiliency of the ring to hold it in position.

In Fig. 2 a plurality of separate sets of ball-bearings are shown as situated close to each other and in such proximity as to prevent the employment of ordinary ball-retainers. The retaining-rings E are applied thereto, it being noted that said rings do not interfere with the other balls or occupy a wider space than the balls themselves, so that the close arrangement of a plurality of sets of ball-bearings is possible in connection with this retaining-ring.

In Figs. 1, 2, and 3 the ball-race C is shown as a separate ring inclosed by the outer shell C', said parts being shown in detail in Figs. 4 and 5. In Fig. 6, however, the race and shell G are made in one piece.

Having thus described my invention, what I claim as new, and desire to secure by Letters Patent, is—

1. A ball-bearing, comprising a bearing portion provided with a race, a plurality of balls situated therein, the walls of said race holding the balls against longitudinal movement in opposite directions relative to said bearing portion, and a retaining-ring provided with a plurality of openings through which the balls project, the diameter of said openings being less than that of said balls.

2. A ball-bearing, comprising a bearing portion provided with a race, a plurality of balls situated therein, the walls of said race holding the balls against longitudinal movement relative thereto, and a divided retaining-ring provided with a plurality of openings through which the balls project, the diameter of said openings being less than that of said balls.

3. A ball-bearing, comprising a bearing portion provided with a race, a plurality of balls situated therein, said race holding the balls against longitudinal movement relative thereto, and a resilient retaining-ring provided with a plurality of openings through which the balls project, the diameter of said openings being less than that of said balls.

4. A ball-bearing, comprising a bearing portion provided with a race, a plurality of balls situated therein, said race holding the balls against longitudinal movement relative thereto, and a divided resilient retaining-ring provided with a plurality of openings through which the balls project, the diameter of said openings being less than that of said balls.

JULIUS. KELLER.

Witnesses:
JOHN A. WIEDERSHEIM,
WM. C. WIEDERSHEIM.